US011179653B2

(12) United States Patent
Arriola et al.

(10) Patent No.: US 11,179,653 B2
(45) Date of Patent: Nov. 23, 2021

(54) LINEAR FRESNEL-BASED DESALINATION

(71) Applicant: The Regents of the University of Michigan, Ann Arbor, MI (US)

(72) Inventors: Pablo Taddei Arriola, Boston, MA (US); Jose Alfaro, Ann Arbor, MI (US); Rafael Enrique Cabanillas López, Hermosillo (MX); Iuliana Mogosanu, Boston, MA (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 16/715,384

(22) Filed: Dec. 16, 2019

(65) Prior Publication Data
US 2020/0188808 A1    Jun. 18, 2020

Related U.S. Application Data

(60) Provisional application No. 62/781,441, filed on Dec. 18, 2018.

(51) Int. Cl.
*B01D 1/00* (2006.01)
*C02F 1/00* (2006.01)
(Continued)

(52) U.S. Cl.
CPC ......... *B01D 1/0035* (2013.01); *B01D 1/0047* (2013.01); *B01D 1/0082* (2013.01);
(Continued)

(58) Field of Classification Search
CPC .. B01D 1/0035; B01D 1/0047; B01D 1/0082; C02F 1/008; C02F 1/14; F24S 23/79;
(Continued)

(56) References Cited

U.S. PATENT DOCUMENTS

| 4,194,949 A | 3/1980 | Stark |
| 5,645,693 A | 7/1997 | Goede |

(Continued)

FOREIGN PATENT DOCUMENTS

| WO | WO2005003646 A1 | 1/2005 |
| WO | WO2005003647 A1 | 1/2005 |
| WO | WO2005078360 A1 | 8/2005 |

OTHER PUBLICATIONS

"Concentrated Solar Still", Wikipedia, Feb. 18, 2020, https://en.wikipedia.org/wiki/Concentrated_solar_still, 3 pages.

(Continued)

*Primary Examiner* — Brian A McCaig
(74) *Attorney, Agent, or Firm* — Lempia Summerfield Katz LLC

(57) ABSTRACT

A desalination system includes a distillation unit to which a fluid to be desalinated is provided and through which a heat transfer fluid flows, and a solar concentration unit configured to heat the heat transfer fluid. The solar concentration unit includes an array of linear Fresnel reflectors, each linear Fresnel reflector of the array of linear Fresnel reflectors rotating about a respective axis, a receiver configured for absorption of light redirected by the array of linear Fresnel reflectors, the receiver comprising tubing through which the heat transfer fluid flows, and a frame supporting and positioning the receiver relative to the array of linear Fresnel reflectors. The frame defines a track along which the receiver is movable to adjust a relative position of the receiver along the respective axis of each linear Fresnel reflector of the array of linear Fresnel reflectors.

21 Claims, 7 Drawing Sheets

(51) Int. Cl.
| | |
|---|---|
| F24S 23/79 | (2018.01) |
| C02F 1/14 | (2006.01) |
| F24S 23/70 | (2018.01) |
| C02F 103/08 | (2006.01) |

(52) U.S. Cl.
CPC ............... *C02F 1/008* (2013.01); *C02F 1/14* (2013.01); *F24S 23/79* (2018.05); *C02F 2103/08* (2013.01); *F24S 2023/872* (2018.05)

(58) Field of Classification Search
CPC ............. F24S 2023/872; Y02A 20/124; Y02A 20/142; Y02A 20/212; Y02E 10/40
See application file for complete search history.

(56) References Cited

U.S. PATENT DOCUMENTS

| | | | |
|---|---|---|---|
| 5,899,199 | A | 5/1999 | Mills |
| 6,131,565 | A | 10/2000 | Mills |
| 6,391,162 | B1 | 5/2002 | Kamiya |
| 7,343,315 | B2 | 3/2008 | Wittmer |
| 8,341,961 | B2 | 1/2013 | Glynn |
| 8,419,904 | B2 | 4/2013 | Ba-abbad |
| 2010/0320071 | A1 | 12/2010 | Siskin |
| 2011/0303214 | A1* | 12/2011 | Welle ...................... F24S 60/00 126/578 |
| 2012/0167873 | A1 | 7/2012 | Venetos |
| 2014/0060519 | A1 | 3/2014 | Bent |
| 2014/0290247 | A1 | 10/2014 | Mishima |
| 2014/0360859 | A1 | 12/2014 | Faidi |

OTHER PUBLICATIONS

"Desalination for Safe Water Supply: Guidance for the Health and Environmental Aspects Applicable to Desalination", Public Health and the Environment, World Health Organization, 2007, 173 pages, Geneva.
"Material and Component Specifications: Linear Fresnel Reflector", Booklet, Dec. 2015, Ministry of New and Renewable Energy, Government of India.
"Renewables 2016: Global Status Report", REN21, 2016, 272 pages.
"Reverse Osmosis", Wikipedia, Mar. 14, 2020, https://en.wikipedia.org/wiki/Reverse_osmosis.
"Review of CSP and Desalination Technology", Nov. 12, 2007, 42 pages.
"Solar Still", Wikipedia, Mar. 3, 2020, https://en.wikipedia.org/wiki/Solar_still.
Alexopoulos et al., "Solar Tower Power Plant in Germany and Future Perspectives of the Development of the Technology in Greece and Cyprus", Renewable Energy, 2010, vol. 35, pp. 1352-1356.
Aramayo et al., "Fresnel Lens Water Purification System 100% Report", Thesis, Florida International University, Nov. 22, 2015, 141 pages.
Benmarraze et al., "Status of Implementation of the First Linear Fresnel Solar Thermal Power Plant in the Middle East—WECSP Solar Project in the Kingdom of Jordan", Energy Procedia, 2015, vol. 69, pp. 1586-1596.
Bremner et al., "World Population Highlights: Key Findings from PRB's 2010 World Population Data Sheet", PRB, Jul. 2010, 16 pages, vol. 65, No. 2.
C. Armenta-Deu, "Water Distillation: a Prototype to Determine Flow Rate Gains Temperature and Salt Concentration Changes in Pressurised System", Renewable Energy, 2004, vol. 29, pp. 1557-1568.
Dr. Franz Trieb, "Concentrating Solar Power for Seawater Desalination", Final Report by German Aerospace Center (DLR), Nov. 2007, 279 pages.
Dr. Fulya Verdier, "MENA Regional Water Outlook: Part II Desalination Using Renewable Energy", Fichtner, Mar. 2011, 529 pages.
Elimelech et al., "The Future of Seawater Desalination: Energy, Technology, and the Environment", Science, Aug. 5, 2011, 7 pages, vol. 333.
Haberle et al., "The Solarmundo Line Focussing Fresnel Collector. Optical and Thermal Performance and Cost Calculations", SolarPACES, Jan. 2002, 12 pages.
Hamed et al., "Concentrating Solar Power for Seawater Thermal Desalination", Desalination, 2016, vol. 396, pp. 70-78.
Hameed et al., "Solar Power Water Distallation Unit", Journal of Physics: Conference Series 450, 2013, 5 pages.
Hassan E.S. Fath, "Solar Distillation: A Promising Alternative for Water Provision with Free Energy, Simple Technology and a Clean Environment", Desalination, 1998, vol. 116, pp. 45-46.
Kecojevic et al., "Haul Truck Fuel Consumption and CO2 Emmission Under Various Engine Load Conditions", Mining Engineering Magazine, Dec. 2010, pp. 44-48.
Lattemann et al., "Global Deslination Situation", Sustainability Science and Engineering, 2010, pp. 7-39, vol. 2.
Matsumoto et al., "Concentrated Solar Distallation as a Means to Purify Saline/Brackish Water", EPA, Aug. 2009, 3 pages, https://cfpub.epa.gov/ncer_abstracts/index.cfm/fuseaction/display.abstractDetail/abstract/8989.
Matthias Gunther, "Advanced CSP Teaching Materials—Linear Fresnel Technology", Advanced CSP Teaching Materials, 2011, pp. 1-43.
Medina et al., "Coastal Aquifers of Sonora: Hydrogeological Analysis Maintaining a Sustainable Equilibrium", Aug. 2011, 14 pages.
Mosleh et al., "A New Desalination System Using a Combination of Heat Pipe, Evacuated Tube and Parabolic Through Collector", Energy Conversion and Management, 2015, vol. 99, pp. 141-150.
Mustafa et al., "Analytical Study of an Innovated Solar Power Tower (PS10) in Aswan", International Journal of Energy Engineering 2012, 2(6), pp. 273-278.
Oulhazzan et al., "Linear Fresnel Concentrator with Dual Energy Solar Tracking Application: Seawater Desalination", European Journal of Scientific Research, Sep. 2016, 9 pages.
Pablo Daniel Taddei Arriola, "Technical, Economic, and Environmental Feasibility Analysis of a Small Scale CSP Desalination Plant in Sonora, Mexico", Thesis, University of Michigan, Apr. 2017, 25 pages.
Palenzuela et al., "Engineering and Economics of Coupling Multi-Effect Distillation and Solar Plants", Concentrating Solar Power and Desalination Plants, 2015, 179 pages, Springer.
Pascale Compain, "Solar Energy for Water Desalination", 1st International Symposium on Innovation and Technology in the Phosphate Industry, 2012, Procedia Engineering 46, 220-227.
Pikra et al., "Development of Small Scale Concentrated Solar Power Plant Using Organic Rankine Cycle for Isolated Region in Indonesia", Energy Procedia, 2013, vol. 32, pp. 122-128.
PV Watts Calculator, National Renewable Energy Laboratory, http://pvwatts.nrel.gov.
Robert Pitz-Paal, "Parabolic Trough, Linear Fresnel, Power Tower: A Technology Comparison", DLR, 2012, 32 pages.
Rowlinson et al., "Potential Role of Renewable Energy in Water Desalination in Australia", Journal of Renewable and Sustainable Energy, 2012, 16 pages, vol. 4.
Saidur et al., "An Overview of Different Distillation Methods for Small Scale Applications", Renewable and Sustainable Energy Reviews, 2011, pp. 4756-4764, vol. 15.
Saxena et al., "A High Rated Solar Water Distillation Unit for Solar Homes", Journal of Engineering, Feb. 2016, 8 pages, vol. 2016, Hindawi Publishing Corporation.
Sea Temperature Info., Accessed Jul. 3, 2017, http://seatemperature.info/es/bahia-de-kino-temperatura-del-agua-del-mar.html.
Sergio Miguel Alegria Casimiro, "Concentrating Solar Power + Desalination Plants (CSP+D): Models and Performance Analysis", Universidade de Lisboa, Thesis, 2015, 282 pages.
Tellez et al., "Evaluation of Technologies for a Desalination Operation and Disposal in the Tularosa Basin, New Mexico", Desalination, 2009, vol. 249, pp. 983-990.

(56) References Cited

OTHER PUBLICATIONS

Trieb et al., "Concentrating Solar Power for Seawater Desalination in the Middle East and North Africa", Desalination, 2008, vol. 220, pp. 165-183.
Trieb et al., "Concentrating Solar Power for Seawater Desalination", IWCT 12, Mar. 27-30, 2008, 15 pages.

\* cited by examiner

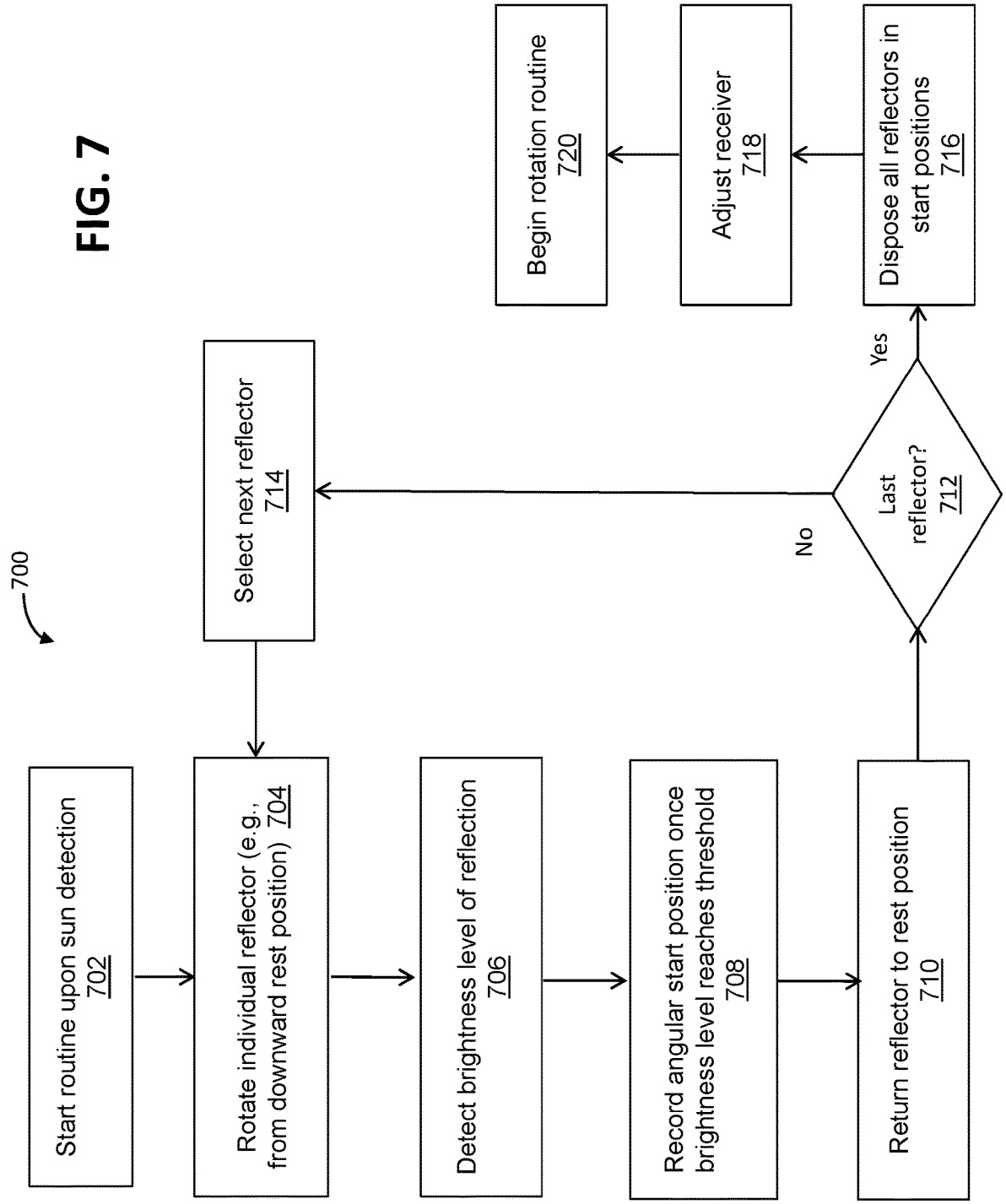

LINEAR FRESNEL-BASED DESALINATION

CROSS-REFERENCE TO RELATED APPLICATION

This application claims the benefit of U.S. provisional application entitled "Linear Fresnel-Based Desalination," filed Dec. 18, 2018, and assigned Ser. No. 62/781,441, the entire disclosure of which is hereby expressly incorporated by reference.

BACKGROUND OF THE DISCLOSURE

Field of the Disclosure

The disclosure relates generally to desalination systems.

Brief Description of Related Technology

Desalination of saltwater is emerging as a viable alternative in order to meet the global community's need for fresh water. Conventional approaches for desalination rely most frequently upon reverse osmosis, which works by passing salt water through a series of membranes to essentially filter the salt from the water to generate fresh water. Unfortunately, reverse osmosis involves significant power consumption.

Solar technologies are in use for desalination in a number of contexts, ranging from small scale systems (e.g., for personal use in survival contexts) to large scale operations directed to providing fresh water on a municipal scale. Solar stills have been used to directly harness the energy from sunlight to heat and distill water, whereas larger systems generally harness sunlight to generate electricity using conventional technology like photovoltaic panels to provide the energy necessary to operate conventional reverse-osmotic desalination plants. Unfortunately, such desalination systems have been either insufficiently effective or prohibitively expensive and undesirably complex for small-scale systems.

SUMMARY OF THE DISCLOSURE

In accordance with one aspect of the disclosure, a desalination system includes a distillation unit to which a fluid to be desalinated is provided and through which a heat transfer fluid flows, and a solar concentration unit configured to heat the heat transfer fluid. The solar concentration unit includes an array of linear Fresnel reflectors, each linear Fresnel reflector of the array of linear Fresnel reflectors rotating about a respective axis, and a receiver configured for absorption of light redirected by the array of linear Fresnel reflectors, the receiver comprising tubing through which the heat transfer fluid flows, and a frame supporting and positioning the receiver relative to the array of linear Fresnel reflectors. The frame defines a track along which the receiver is movable to adjust a relative position of the receiver along the respective axis of each linear Fresnel reflector of the array of linear Fresnel reflectors.

In accordance with another aspect of the disclosure, a desalination system includes a distillation unit to which a fluid to be desalinated is provided and through which a heat transfer fluid flows, and a solar concentration unit configured to heat the heat transfer fluid. The solar concentration unit includes an array of linear Fresnel reflectors, a receiver configured for absorption of light redirected by the array of linear Fresnel reflectors, the receiver comprising tubing through which the heat transfer fluid flows, the tubing being disposed in a receiver tubing plane, and an array frame that supports the array of linear Fresnel reflectors. The array frame includes a set of legs, each leg of the set of legs being independently adjustable to dispose the array of linear Fresnel reflectors in an array plane. The set of legs are disposed such that the receiver tubing plane and the array plane are not in parallel with one another.

In accordance with yet another aspect of the disclosure, a method of initializing a desalination system including a solar concentration unit, the solar concentration unit including an array of linear Fresnel reflectors. The method includes rotating, by a control system of the solar concentration unit, a respective linear Fresnel reflector of the array of linear Fresnel reflectors individually about a respective axis from a rest position of the respective linear Fresnel reflector in which the respective linear Fresnel reflector does not redirect light toward a receiver of the solar concentration unit, while other linear Fresnel reflectors of the array of linear Fresnel reflectors remain disposed in respective rest positions in which the other linear Fresnel reflectors of the array of linear Fresnel reflectors does not redirect the light toward the receiver, detecting, by a light sensor of the solar concentration unit, a brightness level of the light redirected by the respective linear Fresnel reflector while the respective linear Fresnel reflector is rotated, recording, by the control system, a respective angular start position for the respective linear Fresnel reflector once the brightness level reaches a threshold or a maximum, returning, by the control system, the respective linear Fresnel reflector to the rest position of the respective linear Fresnel reflector, and implementing the rotating, detecting, recording, and returning acts for each of the other linear Fresnel reflectors of the array of linear Fresnel reflectors.

In connection with any one of the aforementioned aspects, the systems, devices, and/or methods described herein may alternatively or additionally include any combination of one or more of the following aspects or features. The respective axis of each linear Fresnel reflector of the array of linear Fresnel reflectors is disposed in an array plane. The track is oriented such that the receiver moves in a direction parallel to the array plane. The track is oriented such that the receiver moves in a horizontal direction. The track is configured such that the receiver shifts to accommodate an angle at which solar light impacts the array of linear Fresnel reflectors. The receiver and each linear Fresnel reflector of the array of linear Fresnel reflectors are commensurate in length. The solar concentration unit further includes an array frame that supports the array of linear Fresnel reflectors, the array frame including a set of legs, each leg of the set of legs being independently adjustable to dispose the array of linear Fresnel reflectors in an array plane. The tubing of the receiver is disposed in a receiver tubing plane. Each leg of the set of legs is disposed such that the receiver tubing plane and the array plane are not in parallel with one another. The receiver has a length shorter than each linear Fresnel reflector of the array of linear Fresnel reflectors. The solar concentration unit further includes a light sensor supported by the frame adjacent the receiver, and a control system configured to set an initial rotational position about the respective axis of each linear Fresnel reflector of the array of liner Fresnel reflectors based on a signal from the light sensor. The distillation unit is configured as a single stage distillation system. The solar concentration unit further includes a pulley system supported by the frame and coupled with the receiver, and a hand-operated crank supported by the frame, coupled with the pulley system, and configured to actuate the pulley system to move the receiver along the track. The receiver has a length shorter than each linear Fresnel reflector of the array of linear Fresnel reflectors. The solar concentration unit further includes a light sensor supported by the frame adjacent the receiver, and a control system configured to set an initial rotational position about the respective axis of each linear Fresnel reflector of the array of liner Fresnel reflectors based on a signal from the light sensor. The distillation unit is configured as a single stage distillation system. The solar concentration unit further includes a pulley system supported by the frame and coupled with the receiver, and a hand-operated crank supported by the frame, coupled with cabling of the pulley system, and configured to actuate the pulley system to move the receiver along the track. The frame defines a track along which the receiver is movable to adjust a relative position of the receiver along a respective axis of each linear Fresnel reflector of the array of linear Fresnel reflectors. The method further includes detecting a threshold amount of the light before implementing the rotating, detecting, recording, and returning acts for the respective linear Fresnel reflector. Each linear Fresnel reflector of the array of linear Fresnel reflectors is oriented downward in the rest position. The method further includes disposing each linear Fresnel reflector of the array of linear Fresnel reflectors in the respective angular start position before starting a rotation routine in which each linear Fresnel reflector of the array of linear Fresnel reflectors is rotated at a constant rate to address daily sun movement. The method further includes adjusting a relative position of a receiver along a respective axis of each linear Fresnel reflector of the array of linear Fresnel reflectors to address seasonal sun position.

BRIEF DESCRIPTION OF THE DRAWING FIGURES

For a more complete understanding of the disclosure, reference should be made to the following detailed description and accompanying drawing figures, in which like reference numerals identify like elements in the figures.

FIG. 7 is a flow diagram of a method of initializing a desalination system in accordance with one example.

Figure 1:
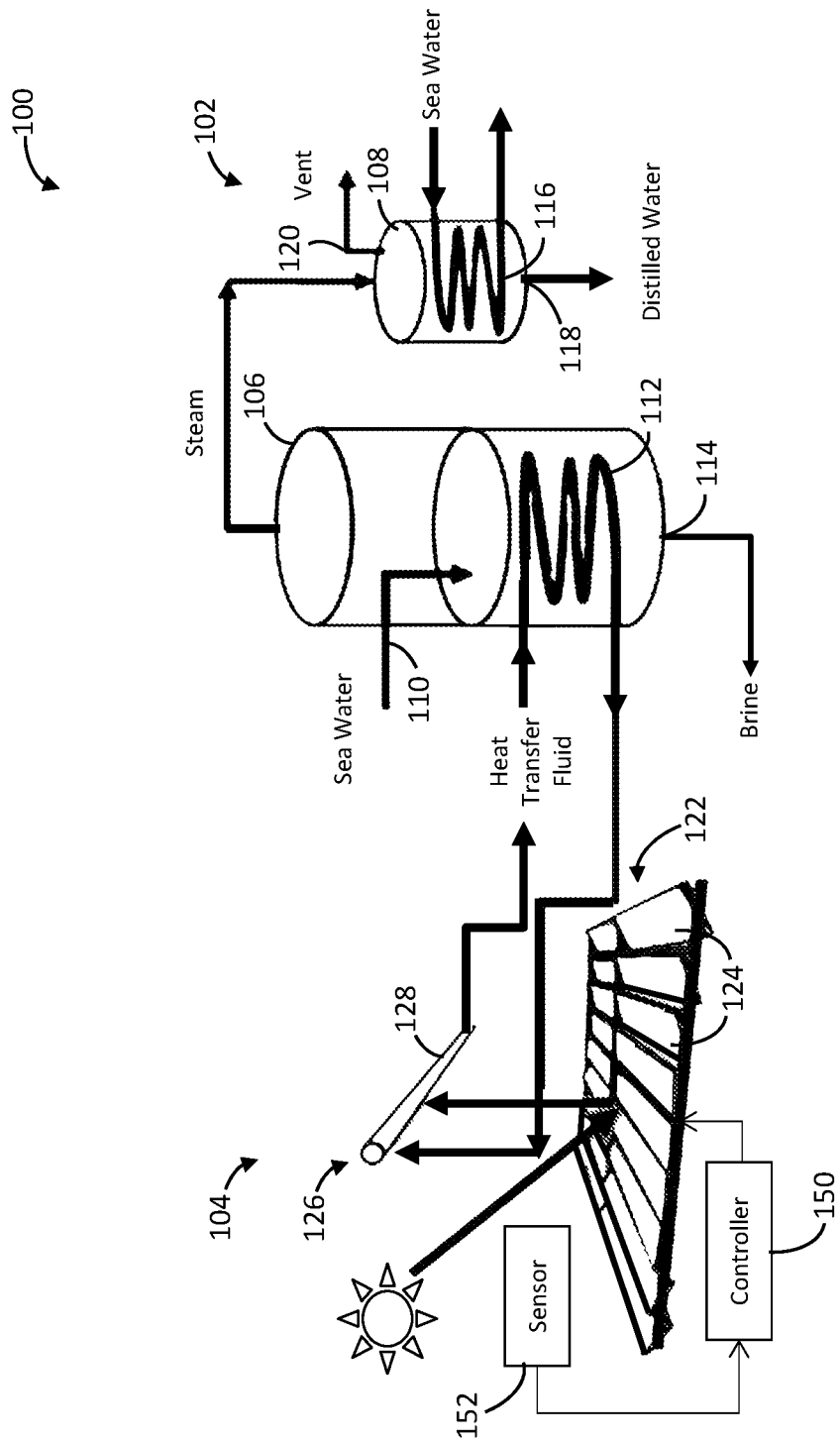
FIG. 1 is a schematic diagram of a desalination system having a distillation unit and a solar concentration unit in accordance with one example.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Desalination systems and methods of initializing and operating the desalination systems are described. The disclosed systems and methods use concentrated solar power to remove salt from, for instance, sea water. The resulting desalinated freshwater is safe for human consumption, while the brine byproduct may be fully or sufficiently concentrated to isolate the salt and other minerals using, for instance, high efficiency evaporation pads. The freshwater produced by the disclosed systems and methods may be used for human consumption (potable water) or agricultural or other food production purposes. In some cases, the steam generated by the heating may be passed through a turbine for power generation and/or powering equipment within or related to the disclosed system, such as one or more pumps.

The desalination systems include a distillation unit through which a fluid to be desalinated flows and a linear Fresnel-based solar concentration unit configured to heat the fluid. Linear Fresnel-based solar concentration may be more useful in small scale operations for several reasons relative to other types of solar concentration systems, such as those involving parabolic reflectors. The reasons include, for example, ease of manufacture, installation, and operation, as well as higher space (e.g., land use) efficiency and lower costs.

Several other aspects of the desalination system are configured in a manner technologically appropriate and economically viable for small scale desalination operations. For instance, seasonal positioning of a receiver of the solar concentration unit may be achieved via a receiver frame that defines a track along which the receiver is moved. The receiver movement positions tubing of the receiver for maximum or otherwise improved solar concentration efficiency. A more compact system may also be achieved, insofar as the receiver need not be sized to accommodate the full range of seasonal sun positions. Moreover, the receiver movement may thus be accomplished manually, e.g., by a single person operating a lever-pulley system. In other cases, the receiver movement may be automated to any desired extent. Another example involves the initial orientation setup of reflectors of the solar concentration unit. The initial setup may use a light sensor-based procedure rather than data intensive look-up tables and other complex data processing regarding daily sun movement. In other cases, the light sensor-based procedure may be used in conjunction with one or more data-based control procedures. As yet another example, the distillation unit may be or include a single distillation stage, which is less expensive, more compact (e.g., space efficient), and has greater ease of operation, relative to other purification systems, such as multi-stage flash evaporation and multi-effect distillation designs. These and other aspects of the disclosed desalination systems may render them operable by laypersons. Technical personnel are therefore not involved onsite on a daily basis.

The solar concentration unit may include a frame for leveling or otherwise disposing reflectors of an array of linear Fresnel reflectors in an array plane. The frame may include a set of mounts or other legs, with each leg being individually adjustable. The adjustments may be used for purposes other than leveling. In some cases, the legs may be adjusted so that the array plane is not in parallel with a plane of the receiver (e.g., the plane in which tubing of the receiver is disposed). The offset in the planes allows the solar energy to be focused in a smaller area, thereby achieving higher solar concentration levels and greater desalination efficiency. The focusing may also be used to realize a more compact system, e.g., for greater land use efficiency.

Turning to the drawing figures, FIG. 1 shows a desalination system 100 having a distillation unit 102 and a solar concentration unit 104. The distillation unit 102 and the solar concentration unit 104 are in fluid communication with one another. The solar concentration unit 104 is configured to heat a heat transfer fluid passed to the distillation unit 102. The heat transfer fluid may be circulated with or otherwise returned to the solar concentration unit 104 for re-heating in a closed loop arrangement as shown. Other arrangements may be used. For instance, sea water or other fluid used for condensation may be added to or otherwise used in connection with the heat transfer fluid. Any heat transfer fluid may be used.

The distillation unit 102 includes an evaporation tank 106 and a condensation tank 108. Fluid to be desalinated, such as sea water, is provided to the evaporation tank 106 via an input port 110. Heat transfer fluid flows through coils 112 within the evaporation tank 106 to heat the fluid to be desalinated. Steam generated from the heating is piped or otherwise transferred to the condensation tank 108. Brine remaining after evaporation is removed from the evaporation tank 106 via an output port 114. In some cases, the brine is re-circulated to the input port 110. The brine may be processed for salt and/or other mineral harvesting after removal from the evaporation tank 106, such as via evaporative or other pads. The configuration, construction, components, and other characteristics of the evaporation tank 106 may vary.

Another heat transfer fluid is provided to the condensation tank 108 to cool and condense the steam into distilled water. The heat transfer fluid may pass through one or more coils 116 as shown. In the example of FIG. 1, the heat transfer fluid is or includes sea water, but other heat transfer fluids may be used. The water condensing within the condensation tank 108 may be removed from the condensation tank 108 via a drain 118 or other output port. The condensation tank 108 may have or include a pressure relief valve or other vent 120 to limit the pressure reached in the condensation tank 108. The configuration, construction, components, and other characteristics of the condensation tank 108 may vary.

In the example of FIG. 1, the distillation unit 102 is or includes a single stage distillation system. Additional stages may be provided. In some cases, the distillation unit 102 is or includes an off-the-shelf or otherwise commercially available distillation system. The configuration, construction, components, and other features and aspects of the distillation unit 102 may vary. For instance, the distillation unit 102 may include any number of evaporators and/or condensers. The tanks 106, 108 may have any number of input and output ports. Various heat transfer or exchange arrangements may be used. Heat transfer may or may not involve one or more coils as shown. For instance, the condensation tank 108 may include a variety of different heat exchange surfaces. The configuration of the tanks 106, 108 and other components of the distillation unit 104 may thus vary from the example shown.

The solar concentration unit 104 is configured to heat the heat transfer fluid for the evaporation tank 106. The solar concentration unit 104 includes an array 122 of linear Fresnel reflectors 124, and a receiver 126 configured for absorption of light redirected by the array 122 of linear Fresnel reflectors 124. As a linear Fresnel system, the solar concentration unit 104 concentrates the incident solar radiation roughly onto a central line or region at the receiver 126 (as opposed to a central point along the line or region). However, unlike other linear Fresnel concentrated solar power systems, the concentration of the solar radiation is not used in the example of FIG. 1 to generate steam for driving turbines for electricity generation. Instead, the incident solar radiation is concentrated to generate steam within the evaporation tank 106 for distillation. In other cases, the steam may be used for purposes in addition to distillation.

The breadth of the line or region at the receiver 126 of the solar concentration unit 106 may vary. For instance, the terms "line" and "region" are used broadly to include any elongated area toward which the concentrated solar radiation is directed. In some cases, the line or region has a breadth that roughly corresponds with the width of each reflector 124, but other breadths may be used.

Each linear Fresnel reflector 124 may be or include an elongate reflective panel disposed in a respective row of the array 122. Alternatively, each row of the array may be considered to include multiple reflectors 124. Each linear Fresnel reflector 124 rotates about a respective axis. As shown in FIG. 1, the extent of the rotation varies from row to row to allow incident light to be focused on the receiver 126 of the solar concentration unit 104. The rotational position about the axis for each row is also individually adjusted throughout each day to address daily sun movement. Any number of reflector rows or reflectors 124 may be included in the array 122. The configuration, construction, and other characteristics of the reflectors 124 may vary. In some cases, the reflectors 124 may be or include off-the-shelf or otherwise commercially available components.

The receiver 126 includes tubing 128 through which the heat transfer fluid flows. The tubing 128 may be darkened (e.g., black) to increase the absorption efficiency. The tubing 128 is depicted schematically in FIG. 1 as a single elongated tube, but the arrangement of the tubing 128 in the receiver 126 may vary considerably from the example shown. For instance, the tubing 128 may include a number of winds or turns to establish or cover a larger surface area for the concentrated light to illuminate.

Figure 2:
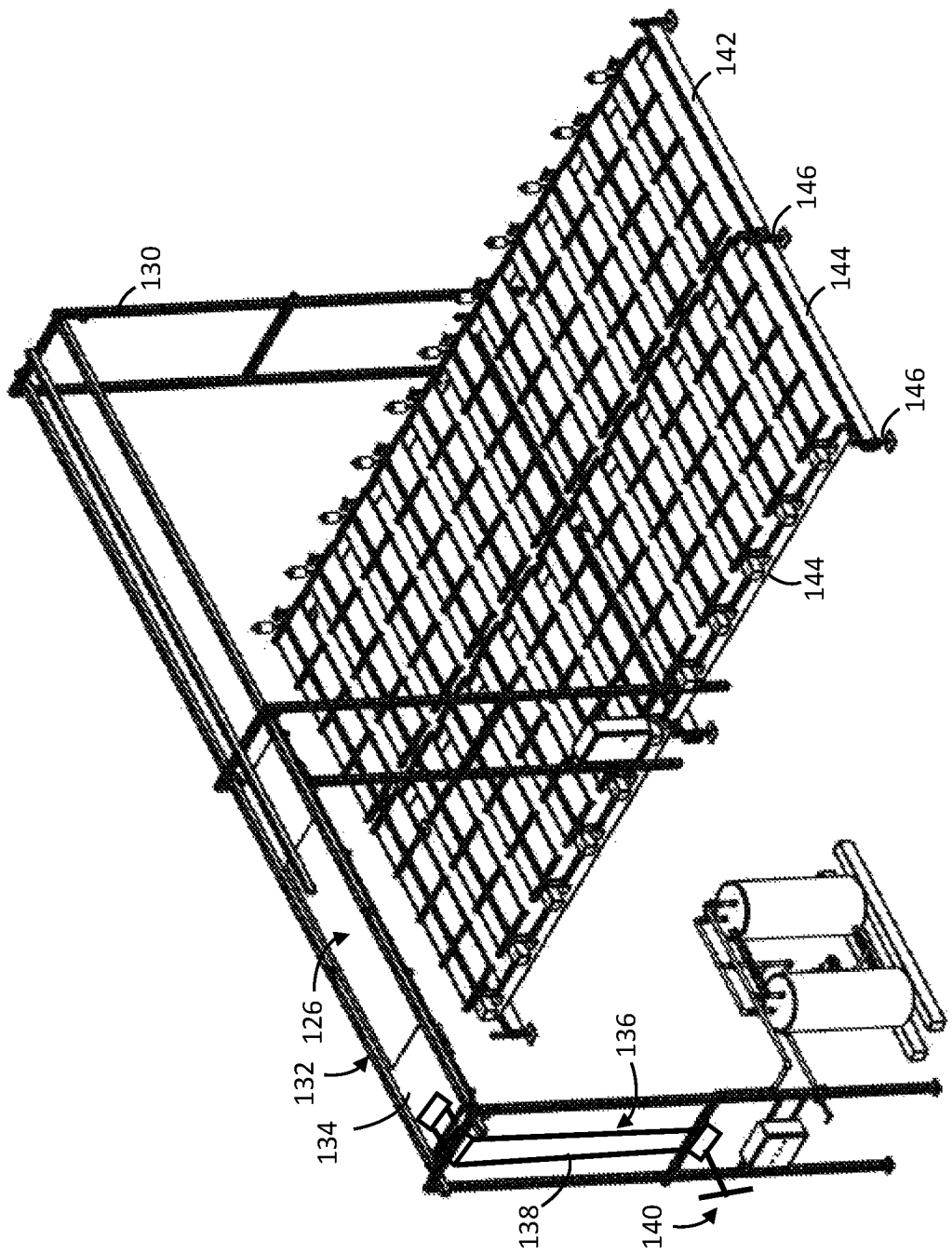
FIG. 2 is a schematic, perspective view of a desalination system having a distillation unit and a solar concentration unit in accordance with one example.
Figure 3:
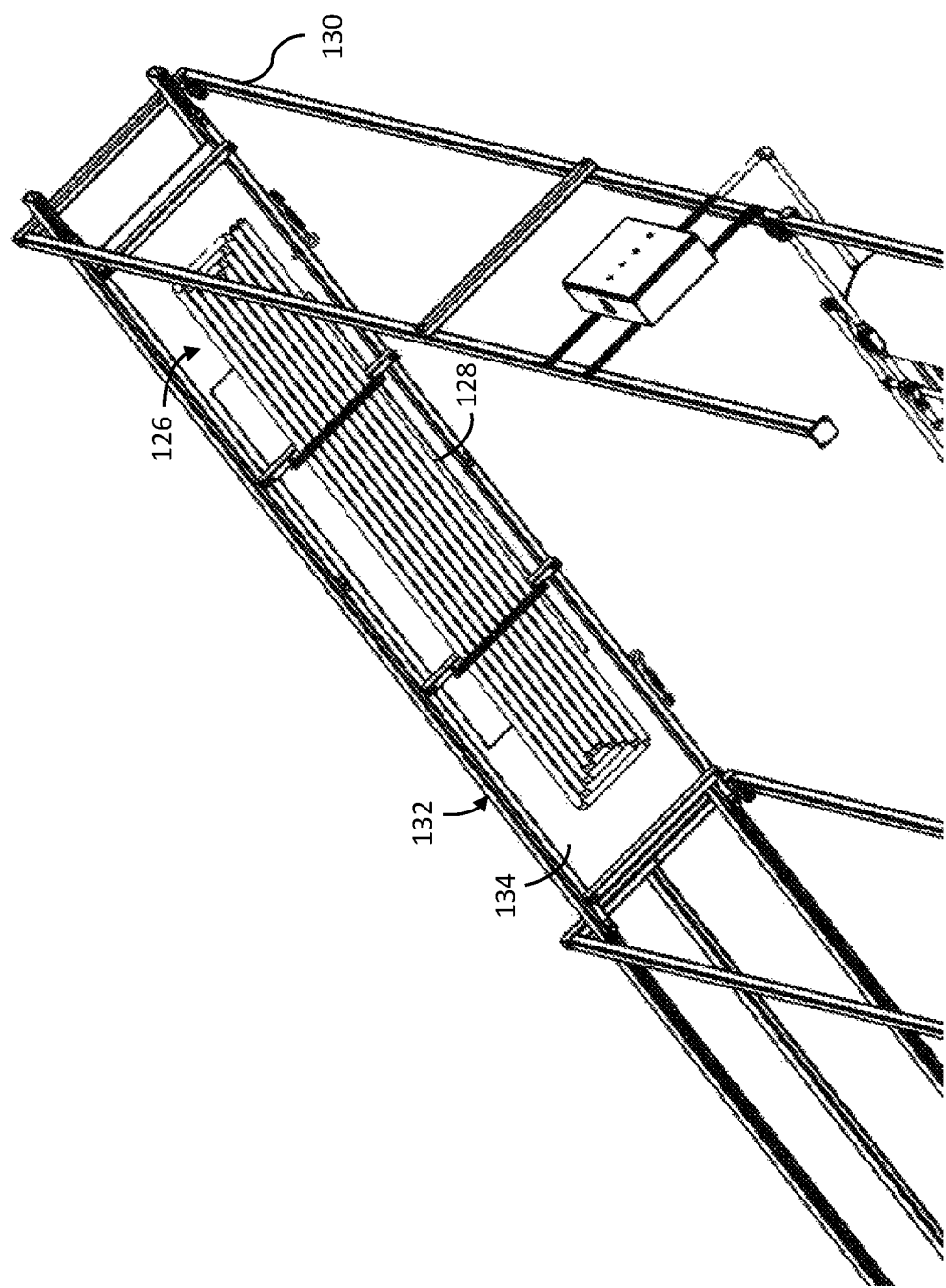
FIG. 3 is a schematic, perspective view of a receiver of the solar concentration unit shown in FIG. 2.

As shown in FIGS. 2 and 3, the solar concentration unit 104 may include a frame 130 supporting and positioning the receiver 126 relative to the array 122 of linear Fresnel reflectors 124. The frame 130 includes or otherwise defines a track 132 along which the receiver 126 is movable to adjust a relative position of the receiver 126 along the respective axis of each linear Fresnel reflector 124 of the array 122. The track 132 is configured such that the receiver 126 shifts to accommodate an angle at which the solar radiation impacts the array 122 of linear Fresnel reflectors 124. Adjustments for seasonal changes in the angle may thus be made. The track 132 may be oriented such that the receiver 126 moves in a horizontal direction (e.g., a generally horizontal direction). Further information regarding the adjustment or movement of the receiver 126 is provided in connection with FIG. 4. In the example of FIG. 2, the track 132 includes, or is configured as, a rail with which a panel 134 of the receiver 126 is engaged. The tubing 128 is mounted on an underside of the panel 134 as shown in FIG. 3.

As shown schematically in FIG. 2, the solar concentration unit 104 may include an actuator or other apparatus to assist an operator in adjusting the position of the receiver 126. In some cases, the actuator is configured such that a single operator is capable of manually adjusting the receiver 126 without requiring the assistance of additional individuals. In the example of FIG. 2, the solar concentration unit 104 includes a pulley system 136 to this end. The pulley system 136 is mounted or otherwise supported by the frame 130. The pulley system 136 includes cabling 138 (e.g., one or more cable loops) engaged with the panel 134. A user pulling on the cabling 138 in one direction causes the receiver 126 to move in one direction (e.g., increasingly overlapped with, or overhead, the array 122). Pulling the cabling 138 in the other direction causes the receiver 126 to move in the opposite direction (e.g., increasingly offset from the array 122). In this case, the pulley system 136 also includes a hand-operated crank or other lever 140 supported by the frame 130 to assist the operator in pulling the cabling 138 and, in so doing, moving the receiver 126. The crank or lever 140 may be coupled with the cabling of the pulley system 136 and configured to actuate the pulley system 136 to move the receiver 126 along the track 132.

A wide variety of other manual actuators and/or apparatus may be used to position the receiver 126. For instance, the receiver 126 may include a handle or cable loop engaged with the panel 134. In still other cases, the adjustment of the receiver 126 may be automated. In still other cases, the adjustment of the receiver 126 may be automated.

As shown in FIG. 2, the solar concentration unit 104 further includes an array frame 142 that supports the array 122 of linear Fresnel reflectors 124. The array frame 142 includes a number of beams 144 and a set of legs 146 or mounts extending therefrom. The configuration, construction, and other characteristics of the array frame 142 may vary considerably from the example shown. For instance, the array frame 142 may include one or more platforms, plates or other planar or other structural elements in addition or alternative to the beams 144.

Returning to FIG. 1, the desalination system 100 may include a controller or control system 150 and a light sensor 152 in communication with the control system 150. The control system 150 is configured to control the array 122 of linear Fresnel reflectors 124. For instance, the control system 150 may be configured to control the rotational position of each reflector 124. For instance, the control system 150 may be configured to generate respective control signals for electric motors of the solar concentration unit 102 for the reflectors. Each motor may be disposed at end of the reflector row as shown.

The control system 150 may also be configured to determine when to initiate and cease solar concentration. For instance, the control system 150 may be configured to set or determine an initial rotational position about the respective axis of each linear Fresnel reflector 124 based on a signal from the light sensor 152. The control system 150 may also be responsive to the signal from the light sensor 152 to determine when to initialize operation. Further details regarding the operation of the system 100 are provided below in connection with FIG. 7.

The light sensor 152 may be or include a light detector configured to generate a signal indicative of the intensity of the ambient and/or concentrated light in the vicinity of the solar concentration unit 102. The light sensor 152 may thus be disposed adjacent the receiver 126. The light sensor 152 may be supported by the frame 130 (FIG. 2) in a position to receive sunlight reflected by the array 122. For example, the light sensor 152 may be mounted on an underside of the panel 134. Additional and/or alternative light detectors or other sensors may be included. The configuration, construction, positioning of the light sensor(s) 152 may vary from the example described above.

One or more additional aspects of the system 100 may be automated and therefore under the direction of the control system 150. For example, the control system 150 may be configured to control the position of the receiver 126. The control system 150 may also be configured to control one or more components of the distillation unit 104. Alternatively, the system 100 includes a respective control system or controller for the distillation unit 104. The number of control systems or controllers may thus vary from the examples shown and described herein.

The control system 150 is or includes one or more processors configured to generate control signals for the array 122 of reflectors 124. In the example of FIG. 1, the control system 150 includes a single processor, such as a field programmable gate array. The processor(s) may be or include a general-purpose processor or an application-specific processor (e.g., an application specific integrated circuit, or ASIC) or other special- or single-purpose processor configured for use in the control system 150. Additional or alternative types of processors may be used, including, for instance, various types of microcontrollers and microprocessors. The processors may be components of an automated control system. The control system 150 may provide functionality in addition to managing the reflectors 124. For instance, the control system 150 may provide or support automated control of the receiver 126, remote data logging and/or other communications, and/or other operational management or control of the desalination system 100.

The control system 150 may include one or more memories in communication with the processor to support the functionality of the control system 150. For instance, computer-executable instructions may be stored in the memory and accessed by the processor for execution. Execution of the instructions may configure the processor to implement one or more control routines. The processor(s), the memory (ies), and/or other components of the control system 150 may be integrated to any desired extent. For instance, in some cases, the control system 150 may include a system-on-a-chip and/or other microcontroller having processing, memory, and other functionality integrated therein. Alternatively or additionally, the control system 150 includes one or more discrete storage devices in communication with the processor(s).

FIG. 3 depicts an example arrangement of the tubing 128 of the receiver 126. In this case, the tubing 128 may be disposed in a winding arrangement in which multiple tube sections extend across the panel 134. In this example, the tubing is disposed in a receiver tubing plane on the underside of the plate 134. The length and the width of the area covered by the tube sections may vary. In some cases, the tube sections are arranged to maximize or increase the efficiency of the energy absorption. For instance, the length and the width of the area covered by the tube sections may correspond with (e.g., be the same size as) the area illuminated by the light from the reflectors 124 (FIG. 2) at the receiver 126. Other aspects of the tubing arrangement may also vary. For instance, the inside and outside diameter of the tubing 128 may be changed to achieve an optimization of heat transfer. For instance, the inside and outside diameter of the tubing 128 may be as small as possible to maximize heat transfer to the fluid but also at a size that allows a desired flow rate to be reached. Alternatively or additionally, the tubing 128 may be oriented in one dimension (e.g., the elongated dimension of the receiver 126), with short, curved pieces in another (e.g., orthogonal) dimension (e.g., the dimension orthogonal to the elongated dimension of the receiver 126). The converse of that orientation may also be used. Other configurations and arrangements may be used. For instance, the distance between the tubing 128 and the plate 134 may also vary.

Figure 4:
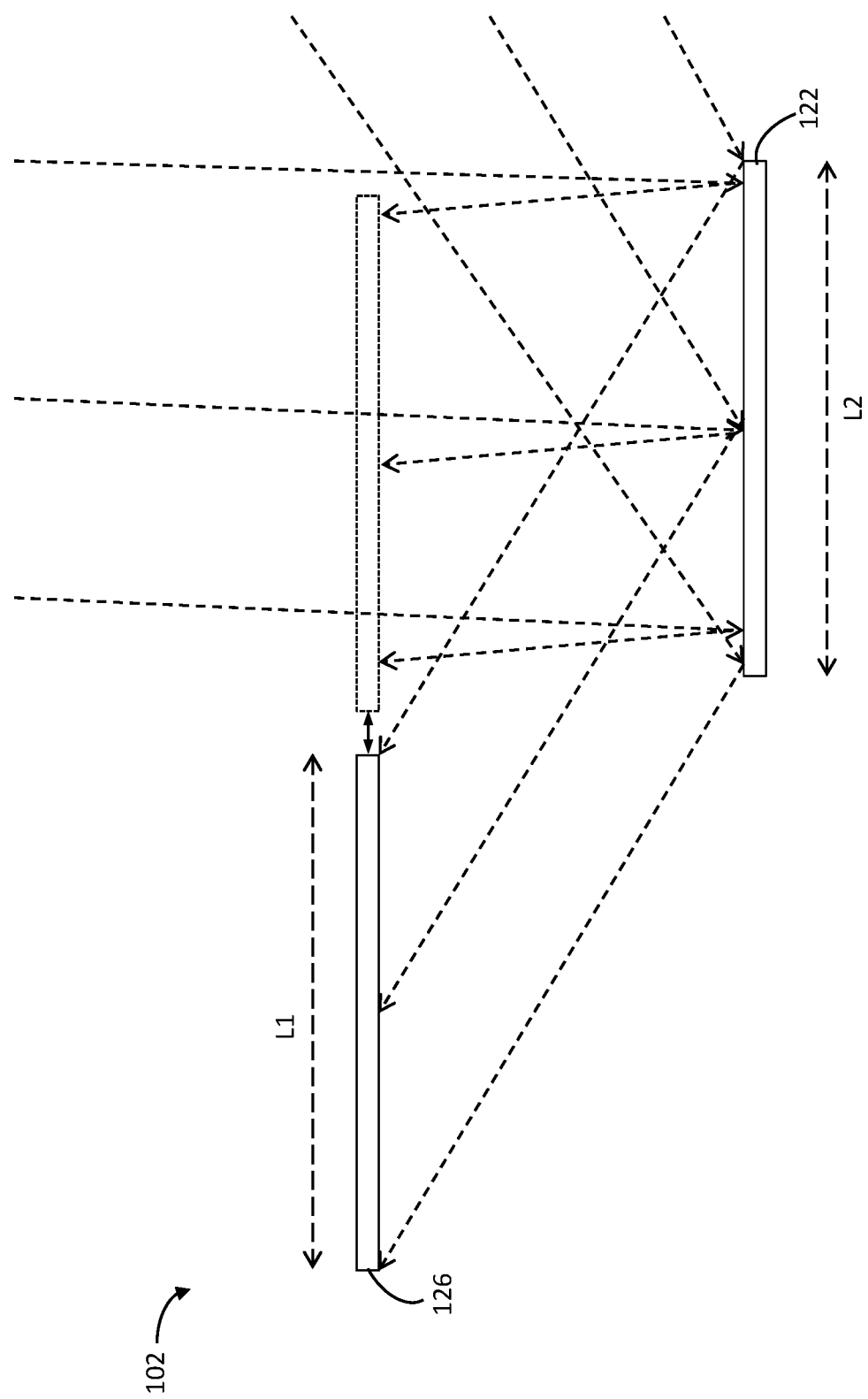
FIG. 4 is a schematic depiction of relative movement and operation of a receiver and a linear Fresnel reflector array of a solar concentration unit in accordance with one example.

FIG. 4 is a partial, schematic representation of the solar concentration unit 102 to depict the movement of the receiver 126 relative to the reflector array 122. The movement may be directed to addressing the seasonal variation in the position of the sun in the sky. The receiver 126 is initially disposed in a position offset from the array 122 to accommodate sun light at a higher incident angle relative to the surface normal (e.g., sun light during winter). The position of the receiver 126 is shifted to the increasingly overhead position shown as the incidence angle decreases.

In this example, the track (FIGS. 2 and 3) is oriented such that the receiver 126 shifts in a horizontal direction (e.g., roughly horizontal direction). The direction of the movement is also parallel to the plane of the array 122 in this case. The array plane corresponds with the plane in which the respective axis of each reflector of the array 122 is disposed.

The movement of the receiver 126 allows the receiver 126 and each linear Fresnel reflector of the array 122 to be commensurate in length. The length L1 of the receiver 126 may thus be approximately the same as the length L2 of each reflector in the array 122. The length L1 can cover a range of positions via the track of the frame described above. Without the receiver movement, the receiver 126 would be longer than the array 122 to accommodate for the seasonal variation in incident angle. The receiver 126 and, thus, the solar concentration unit 102 may be more compact and land-use efficient as a result. The concentration efficiency may also be increased as a result of the shorter length. The shorter length avoids having tubing of the receiver extend along a section of the receiver not illuminated by the reflected radiation. The relative portion of the heat transfer fluid exposed to heating is thereby increased. Notwithstanding the foregoing, the receiver length L1 may be greater than the array length L2 in some cases.

Figure 5:
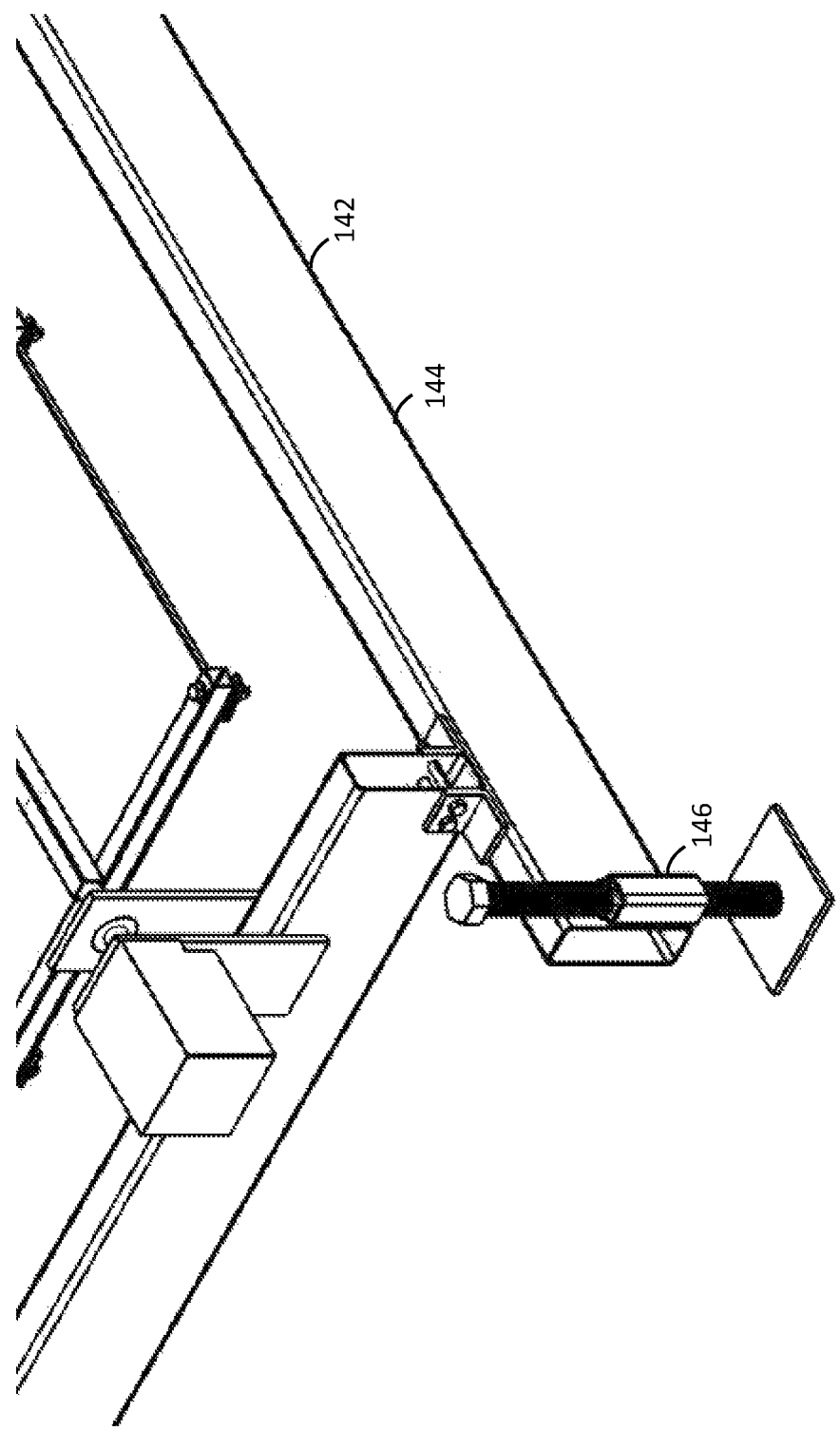
FIG. 5 is a schematic, perspective view of a leg of an array frame configured to support an array of linear Fresnel reflectors in accordance with one example.

FIG. 5 depicts the legs or mounts 146 of the array frame 142 in greater detail. Each leg 146 is independently or separately adjustable to establish a height at which the beams 144 are supported above a surface on which the array frame 146 rests. In this example, each leg 146 includes a threaded rod that engages a sleeve or other frame portion fixed to one of the beams 144. Rotation of the leg 146 accordingly adjusts the extent to which the leg 146 extends downward from the beam 144.

The independent adjustment of the legs 146 may be used to dispose the array 122 in an array plane. The array 122 may thus be deployed in an area having an uneven or non-flat surface. Disposition in an array plane is useful for ensuring that, despite the uneven surface, the light reflected by each one of the reflectors is redirected toward the receiver 126 (FIG. 4). The array plane may or may not be parallel to the receiver tubing plane.

Figure 6:
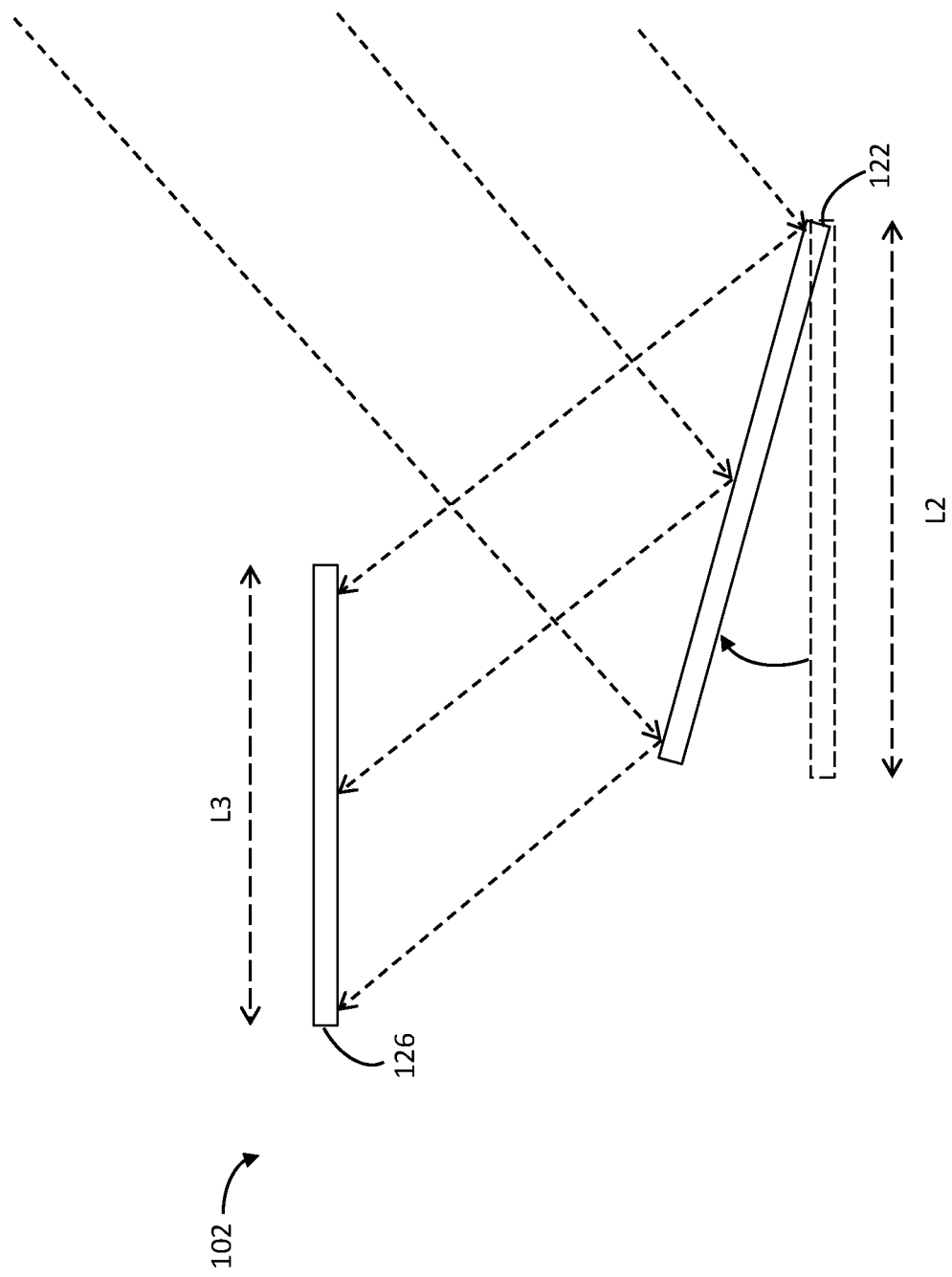
FIG. 6 is a schematic depiction of an adjustment of an array frame for positioning of a linear Fresnel reflector array relative to a receiver in accordance with one example.

FIG. 6 depicts an example in which the array plane is intentionally oriented at an angle relative to the receiver tubing plane. In this case, each leg of the set of legs is disposed such that the receiver tubing plane and the array plane are not in parallel with one another. As shown in FIG. 6, the end of the array closest to (e.g., underneath) the receiver is higher than the other end. This inclined orientation of the array plane may be used to increase the concentration of the solar radiation along the length of the receiver. As a result of the inclined orientation, incident light is concentrated over a shorter length L3 than the reflector length L2. The receiver may accordingly have a length shorter than each linear Fresnel reflector of the array, thereby further increasing land-use and energy efficiency. The inclined orientation may also be useful for limiting the range over which the receiver is adjusted for seasonal movement of the sun.

FIG. 7 shows one example of a method 700 of initializing a desalination system, such as one of the systems described above. The method 700 may be implemented by the control system 150 (FIG. 1) and/or another controller or processor. The controller or processor may include and/or be in communication with one or more memories on which instructions are stored, the execution of which by the processor or controller configures the processor or controller to implement the acts of the method 700.

The method 700 may begin with an act 702 in which an initialization routine is started upon detection of sufficient sun light. For example, the controller may receive a signal from an ambient or other light sensor indicating that the intensity of the solar radiation has crossed a predetermined threshold. The threshold may be crossed each morning or at other times if, for instance, the morning hours of the day were too cloudy.

The routine may be configured to establish the starting position for each reflector of the array. To that end, each reflector is rotated separately to determine the starting position as described below.

Once the routine is started, the controller rotates in an act 704 a first reflector, such as the reflector at one end of the array, is rotated individually about a respective axis from a rest position. The rest position may correspond with any position that does not redirect light toward a receiver of the solar concentration unit. In some cases, the rest position orients the reflector downward, such that the reflector faces the ground. The other reflectors of the array remain disposed in their respective rest positions. In that way, the other reflectors do not interfere with the testing for the first reflector.

In an act 706, a light sensor is used to detect a brightness level of the light redirected by the first reflector while the first linear Fresnel reflector is rotated. The light sensor may be one of the light sensors described above. Once the brightness level reaches a threshold or a maximum, the controller records a respective angular start position for the reflector in an act 708. The first reflector is then returned to its rest position in an act 710. Data indicative of the start position may be stored by the processor in the memory or another memory.

Control then passes to a decision block 712 in which the processor determines whether the last reflector has been processed. If not, then control passes to an act 714 in which the next reflector in the array is selected. The above-described rotating, detecting, recording, and returning acts are then implemented for the next reflector, and so on for each of the other reflectors of the array.

If the last reflector has been processed, control passes to an act 716 in which all of the reflectors are disposed in the start positions. The processor may access the memory to obtain the data indicative of the start positions.

In the example of FIG. 7, the receiver position is adjusted either manually or automatically in an act 718 before a rotation routine is implemented in an act 720. With all of the reflectors in the start position, it may be easier for an operator to determine (e.g., see) whether an adjustment to the receiver is warranted. The rotation routine may be configured to rotate each reflector at a constant rate for the rest of the day to address daily sun movement. The receiver position may be adjusted as described above, e.g., along a respective axis of each reflector to address seasonal sun position.

Use of the above-described light sensor-based routine and a constant rotational rate avoids having to rely on a complex data processing system and/or a large memory in which position data is stored for each reflector for a long time period, e.g., for each time of day for each day of a year.

The method 700 may include fewer, additional, or alternative acts. For instance, the method 700 may not include the act 718.

The order of the acts of the method 700 may differ from the example shown. For instance, the act 718 may be implemented at any time during the method 700, including concurrently with one of the other acts of the method 700.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A desalination system comprising:
   a distillation unit to which a fluid to be desalinated is provided and through which a heat transfer fluid flows; and
   a solar concentration unit configured to heat the heat transfer fluid, the solar concentration unit comprising:
      an array of linear Fresnel reflectors, each linear Fresnel reflector of the array of linear Fresnel reflectors rotating about a respective axis;
      a receiver configured for absorption of light redirected by the array of linear Fresnel reflectors, the receiver comprising tubing through which the heat transfer fluid flows; and
      a frame supporting and positioning the receiver relative to the array of linear Fresnel reflectors;
   wherein the frame defines a track along which the receiver is movable to adjust a relative position of the receiver along the respective axis of each linear Fresnel reflector of the array of linear Fresnel reflectors.

2. The desalination system of claim 1, wherein:
   the respective axis of each linear Fresnel reflector of the array of linear Fresnel reflectors is disposed in an array plane; and
   the track is oriented such that the receiver moves in a direction parallel to the array plane.

3. The desalination system of claim 1, wherein the track is oriented such that the receiver moves in a horizontal direction.

4. The desalination system of claim 1, wherein the track is configured such that the receiver shifts to accommodate an angle at which solar light impacts the array of linear Fresnel reflectors.

5. The desalination system of claim 1, wherein the receiver and each linear Fresnel reflector of the array of linear Fresnel reflectors are commensurate in length.

6. The desalination system of claim 1, wherein the solar concentration unit further comprises an array frame that supports the array of linear Fresnel reflectors, the array frame comprising a set of legs, each leg of the set of legs being independently adjustable to dispose the array of linear Fresnel reflectors in an array plane.

7. The desalination system of claim 6, wherein:
   the tubing of the receiver is disposed in a receiver tubing plane; and
   each leg of the set of legs is disposed such that the receiver tubing plane and the array plane are not in parallel with one another.

8. The desalination system of claim 1, wherein the receiver has a length shorter than each linear Fresnel reflector of the array of linear Fresnel reflectors.

9. The desalination system of claim 1, wherein the solar concentration unit further comprises:
   a light sensor supported by the frame adjacent the receiver; and
   a control system configured to set an initial rotational position about the respective axis of each linear Fresnel reflector of the array of liner Fresnel reflectors based on a signal from the light sensor.

10. The desalination system of claim 1, wherein the distillation unit is configured as a single stage distillation system.

11. The desalination system of claim 1, wherein the solar concentration unit further comprises:
    a pulley system supported by the frame and coupled with the receiver; and
    a hand-operated crank supported by the frame, coupled with the pulley system, and configured to actuate the pulley system to move the receiver along the track.

12. A desalination system comprising:
    a distillation unit to which a fluid to be desalinated is provided and through which a heat transfer fluid flows; and
    a solar concentration unit configured to heat the heat transfer fluid, the solar concentration unit comprising:
       an array of linear Fresnel reflectors;
       a receiver configured for absorption of light redirected by the array of linear Fresnel reflectors, the receiver comprising tubing through which the heat transfer fluid flows, the tubing being disposed in a receiver tubing plane; and
       an array frame that supports the array of linear Fresnel reflectors, the array frame comprising a set of legs, each leg of the set of legs being independently adjustable to dispose the array of linear Fresnel reflectors in an array plane;
    wherein the set of legs are disposed such that the receiver tubing plane and the array plane are not in parallel with one another.

13. The desalination system of claim 12, wherein the receiver has a length shorter than each linear Fresnel reflector of the array of linear Fresnel reflectors.

14. The desalination system of claim 12, wherein the solar concentration unit further comprises:
    a light sensor supported by the frame adjacent the receiver; and
    a control system configured to set an initial rotational position about the respective axis of each linear Fresnel reflector of the array of liner Fresnel reflectors based on a signal from the light sensor.

15. The desalination system of claim 12, wherein the distillation unit is configured as a single stage distillation system.

16. The desalination system of claim 12, wherein the solar concentration unit further comprises:
    a pulley system supported by the frame and coupled with the receiver; and
    a hand-operated crank supported by the frame, coupled with cabling of the pulley system, and configured to actuate the pulley system to move the receiver along the track.

17. The desalination system of claim 12, wherein the frame defines a track along which the receiver is movable to adjust a relative position of the receiver along a respective axis of each linear Fresnel reflector of the array of linear Fresnel reflectors.

18. A method of initializing a desalination system, the desalination system comprising a solar concentration unit, the solar concentration unit comprising an array of linear Fresnel reflectors, the method comprising:
- rotating, by a control system of the solar concentration unit, a respective linear Fresnel reflector of the array of linear Fresnel reflectors individually about a respective axis from a rest position of the respective linear Fresnel reflector in which the respective linear Fresnel reflector does not redirect light toward a receiver of the solar concentration unit, while other linear Fresnel reflectors of the array of linear Fresnel reflectors remain disposed in respective rest positions in which the other linear Fresnel reflectors of the array of linear Fresnel reflectors does not redirect the light toward the receiver;
- detecting, by a light sensor of the solar concentration unit, a brightness level of the light redirected by the respective linear Fresnel reflector while the respective linear Fresnel reflector is rotated;
- recording, by the control system, a respective angular start position for the respective linear Fresnel reflector once the brightness level reaches a threshold or a maximum;
- returning, by the control system, the respective linear Fresnel reflector to the rest position of the respective linear Fresnel reflector;
- implementing the rotating, detecting, recording, and returning acts for each of the other linear Fresnel reflectors of the array of linear Fresnel reflectors; and
- adjusting a relative position of a receiver along a respective axis of each linear Fresnel reflector of the array of linear Fresnel reflectors to address seasonal sun position.

19. The method of claim 18, further comprising detecting a threshold amount of the light before implementing the rotating, detecting, recording, and returning acts for the respective linear Fresnel reflector.

20. The method of claim 18, wherein each linear Fresnel reflector of the array of linear Fresnel reflectors is oriented downward in the rest position.

21. The method of claim 18, further comprising disposing each linear Fresnel reflector of the array of linear Fresnel reflectors in the respective angular start position before starting a rotation routine in which each linear Fresnel reflector of the array of linear Fresnel reflectors is rotated at a constant rate to address daily sun movement.

* * * * *